(12) United States Patent
Perucca et al.

(10) Patent No.: US 9,932,005 B2
(45) Date of Patent: Apr. 3, 2018

(54) VEHICLE BUMPER ASSEMBLY

(71) Applicant: FLEX-N-GATE ADVANCED PRODUCT DEVELOPMENT LLC, Warren, MI (US)

(72) Inventors: Steven Perucca, Clinton Township, MI (US); John Chiang, Farmington Hills, MI (US); Paul Martini, Belle River (CA)

(73) Assignee: FLEX-N-GATE ADVANCED PRODUCT DEVELOPMENT LLC., Warren, MI (US)

( * ) Notice: Subject to any disclaimer, the term of this patent is extended or adjusted under 35 U.S.C. 154(b) by 0 days.

(21) Appl. No.: 15/098,250

(22) Filed: Apr. 13, 2016

(65) Prior Publication Data
US 2017/0297520 A1   Oct. 19, 2017

(51) Int. Cl.
*B60R 19/18* (2006.01)
*B60R 19/26* (2006.01)

(52) U.S. Cl.
CPC .............. *B60R 19/26* (2013.01); *B60R 19/18* (2013.01); *B60R 2019/1886* (2013.01)

(58) Field of Classification Search
CPC .. B60R 19/18; B60R 19/26; B60R 2019/1886
USPC ................................. 293/102, 121, 133, 155
See application file for complete search history.

(56) References Cited

U.S. PATENT DOCUMENTS

| | | | |
|---|---|---|---|
| 3,704,887 A | 12/1972 | Thorton | |
| 4,072,334 A | 2/1978 | Seegmiller et al. | |
| 4,252,355 A | 2/1981 | Goupy et al. | |
| 4,413,856 A | 11/1983 | McMahan et al. | |
| 4,875,728 A | 10/1989 | Copp et al. | |
| 4,929,008 A | 5/1990 | Esfandiary | |
| 4,997,229 A | 3/1991 | Swanson | |
| 5,165,643 A | 11/1992 | Shreiner | |
| 5,269,574 A | 12/1993 | Bhutani et al. | |
| 5,487,575 A | 1/1996 | Chase | |
| 5,585,179 A | 12/1996 | Nishiyama | |
| 5,620,218 A | 4/1997 | Saltzman et al. | |
| D382,237 S | 8/1997 | Lund et al. | |
| 5,711,562 A | 1/1998 | Terada et al. | |
| 5,725,933 A | 3/1998 | Nishiyama | |
| 5,799,975 A | 9/1998 | Crick | |
| 5,934,544 A | 8/1999 | Lee et al. | |
| D419,931 S | 2/2000 | Horbury et al. | |

(Continued)

FOREIGN PATENT DOCUMENTS

| | | |
|---|---|---|
| EP | 0949092 | 10/1999 |
| EP | 2380781 | 10/2011 |

(Continued)

*Primary Examiner* — Dennis H Pedder
(74) *Attorney, Agent, or Firm* — Foley & Lardner LLP

(57) ABSTRACT

A vehicle bumper assembly is provided having an energy absorber, a bracket, a step pad and a bumper fascia. The energy absorber includes an upper horizontal surface wherein the upper horizontal surface may define a deformable structure. The deformable structure may be in the form of flexible fins. The bracket may be mounted to the vehicle frame on a first end of the bracket and the energy absorber affixed to a second end of the bracket. The step pad may be affixed to the energy absorber. The bumper fascia may be affixed to either or both the step pad and the energy absorber.

20 Claims, 9 Drawing Sheets

(56) References Cited

U.S. PATENT DOCUMENTS

| | | | |
|---|---|---|---|
| D419,932 S | 2/2000 | Horbury et al. | |
| 6,065,786 A | 5/2000 | Wheatley | |
| 6,116,162 A | 9/2000 | Santa Cruz et al. | |
| 6,152,503 A | 11/2000 | Jang et al. | |
| D446,485 S | 8/2001 | Shin | |
| D447,452 S | 9/2001 | Im | |
| D447,453 S | 9/2001 | Kim | |
| D447,454 S | 9/2001 | Kim | |
| 6,325,121 B1 | 12/2001 | Hudnall | |
| 6,325,431 B1 | 12/2001 | Ito | |
| 6,381,802 B2 | 5/2002 | Park | |
| 6,652,011 B1 | 11/2003 | Khan | |
| 6,669,251 B2* | 12/2003 | Trappe | B60R 19/18 293/109 |
| 8,042,847 B2* | 10/2011 | Garg | B60R 19/12 293/102 |
| 2004/0108737 A1 | 6/2004 | Evans | |
| 2010/0102577 A1 | 4/2010 | Ginja et al. | |
| 2011/0193370 A1* | 8/2011 | Klimek | B60R 19/34 296/187.09 |

FOREIGN PATENT DOCUMENTS

| | | |
|---|---|---|
| FR | 2829083 | 3/2003 |
| FR | 2866830 | 9/2005 |
| FR | 2887508 | 12/2006 |

\* cited by examiner

US 9,932,005 B2

VEHICLE BUMPER ASSEMBLY

BACKGROUND

The present invention relates generally to bumpers, and more particularly, to energy absorbing vehicle bumper systems.

Bumpers typically extend widthwise across the front and rear of a vehicle and are mounted to rails that extend in a lengthwise direction. The bumper may also attach to a tow hitch assembly which, in turn, may be attached to the vehicle frame rails. Alternatively, the bumper may be attached to the tow hitch assembly which is then attached to the bumper assembly system before the bumper assembly system is attached to the vehicle. Energy absorbing bumper systems attempt to reduce vehicle damage as a result of a collision by managing impact energy and intrusion while not exceeding a rail load limit of the vehicle.

Steel beams are commonly used as bumpers. A steel beam is very stiff and provides structural strength and rigidity. Steel beams, however, are rather heavy. In addition, steel beams can crush or buckle and do not maintain a section modulus throughout an impact event.

Some bumper assemblies include shock absorbers. Such shock absorbers are positioned, for example, between a steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a beam and an energy absorber. The beam typically is steel. An energy absorber commonly used with steel beams is foam. Foam based energy absorbers typically have slow loading upon impact, which results in a high displacement. Further, foams are based effective to a sixty or seventy percent compression, and beyond that point, foams become incompressible so that the impact energy is not fully absorbed. The remaining impact energy is absorbed through deformation of the beam and/or vehicle structure.

The efficiency of a bumper system, or assembly, is defined as the amount of energy absorbed over distance, or the bumper system absorbs more energy over a shorter distance than a low energy absorber. High efficiency is achieved by building load quickly to just under the rail load limit and maintaining that load constant until the impact energy has been dissipated. Known shockless bumper systems that include a steel beam with a foam energy absorber generally have an efficiency less than fifty (50%).

Bumpers also have additional functions such as a horizontal step surface to support a customer's access to different areas of the vehicle that cannot be accessed from ground level.

SUMMARY

The present disclosure provides for a vehicle bumper assembly having an energy absorber, a bracket, a step pad and a bumper fascia. The energy absorber includes an upper horizontal surface wherein the upper horizontal surface includes a deformation structure. The deformation structure may be in the form of flexible fins which are disposed in a substantially diagonal direction relative to the longitudinal axis of a vehicle. The bracket may be mounted to the vehicle frame on a first end of the bracket and the energy absorber affixed to a second end of the bracket. The step pad may be affixed to the energy absorber. The bumper fascia may be affixed to either or both the step pad and the energy absorber.

BRIEF DESCRIPTION OF THE DRAWINGS

The present invention will now be described by way of example, with reference to the accompanying drawings.

DETAILED DESCRIPTION

Figure 1:
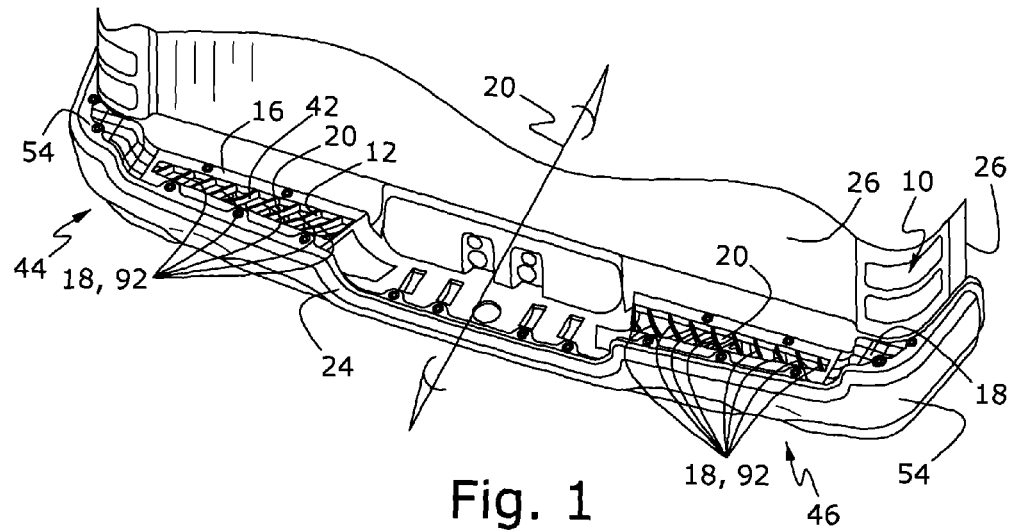
FIG. 1 is an isometric view of a first embodiment of the vehicle bumper assembly.

A vehicle bumper assembly 10 having improved energy absorption characteristics is described below in detail. With reference to FIG. 1 a first embodiment of the present disclosure is shown wherein the step pad 14 (shown in FIG. 3) is removed so that the energy absorber 12 may be viewed. As shown, the energy absorber 12 includes an upper horizontal surface 16 wherein the upper horizontal surface 16 defines a deformable structure 92 shown as a plurality of fins 18 as a non-limiting example of such deformable structure 92. The plurality of fins 18 are disposed in a substantially diagonal direction relative to the longitudinal axis 20 of the vehicle. The fins 18, may but not necessarily, be defined in the upper horizontal surface 16 which wraps around the bumper corner 54.

Moreover, as shown in FIGS. 3-7, brackets 22 are mounted to the vehicle frame on a first end 23 of the bracket 22 and the energy absorber 12 affixed to a second end 25 of the bracket. The second end of each bracket 22 includes a plurality of mounting arms 30 which are affixed to the energy absorber at a plurality of corresponding different mounting locations along the energy absorber 12. Bracket 22 includes vertical side 28 configured to be adjacent to vehicle frame 62 (or bumper beam). Moreover, as shown, bracket 22 may include crush initiators 66 (shown as apertures 67 in FIGS. 4 and 5).

Figure 2:
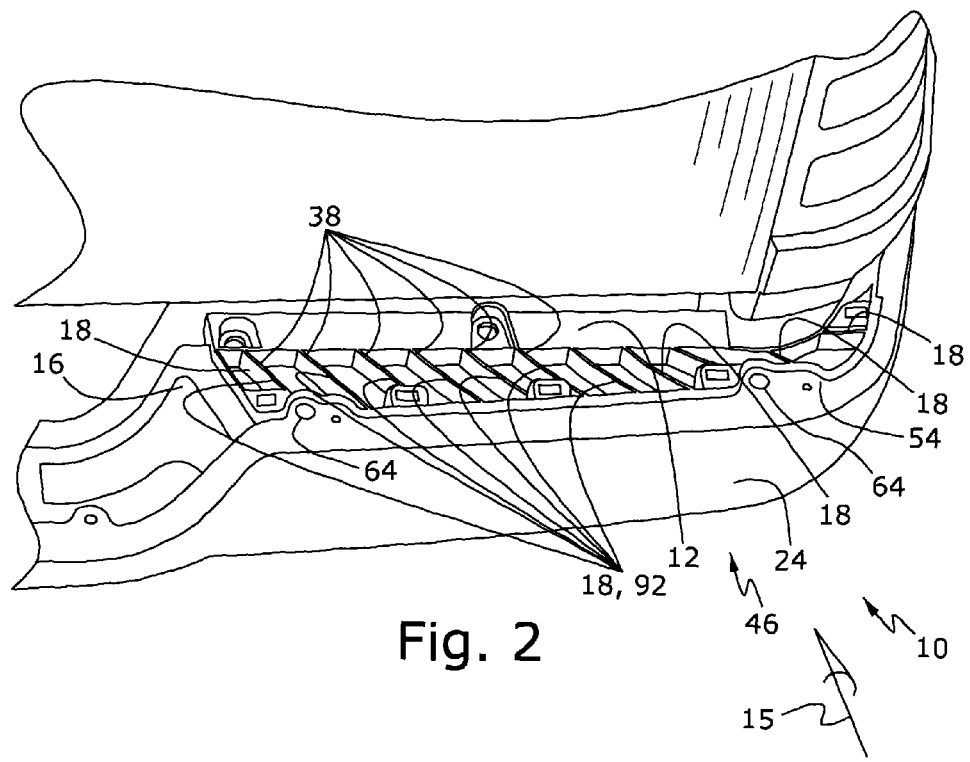
FIG. 2 is an upper rear view of the first embodiment of the vehicle bumper assembly with the step pad removed.
Figure 3:
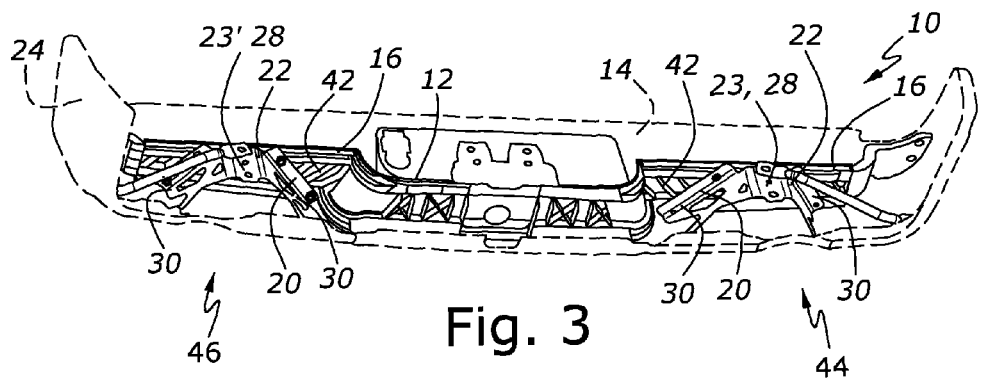
FIG. 3 is a lower front view of the first embodiment of the vehicle bumper assembly.

Referring to FIG. 3, the step pad 14 may be affixed to the energy absorber 12; and with reference to FIGS. 1-7, the bumper fascia 24 may be affixed to at least one of the step pad 14 and/or the energy absorber 12. In FIG. 2 fastening points 64 are formed in the bumper fascia 24 so that the bumper fascia 24 may be mounted and affixed to the energy absorber 12. As is evident in FIGS. 1-11, the energy absorber 12 of the first embodiment may span the width or the substantial width of the vehicle 26 as a single component.

Figure 4:
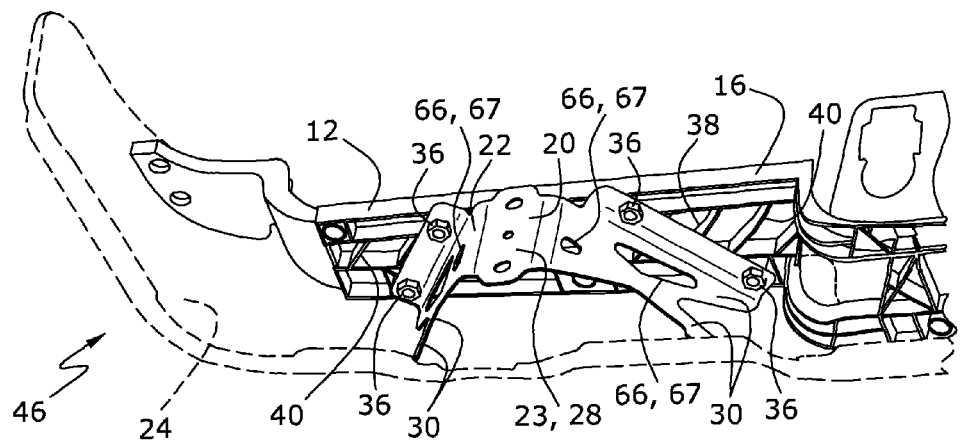
FIG. 4 is a lower front view of a first embodiment of the right side of the vehicle bumper assembly with the step pad removed.
Figure 5:
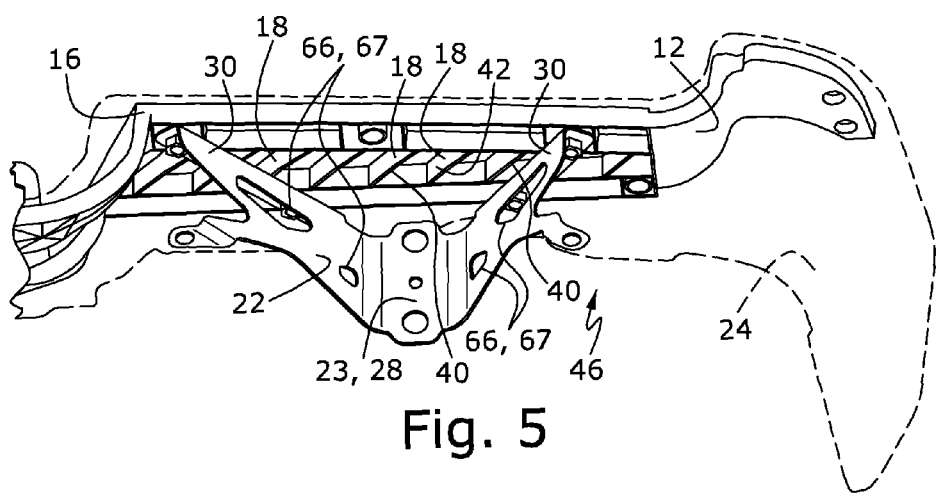
FIG. 5 is a lower rear view of a first embodiment of the right side of the vehicle bumper assembly with the step pad removed.
Figure 6:
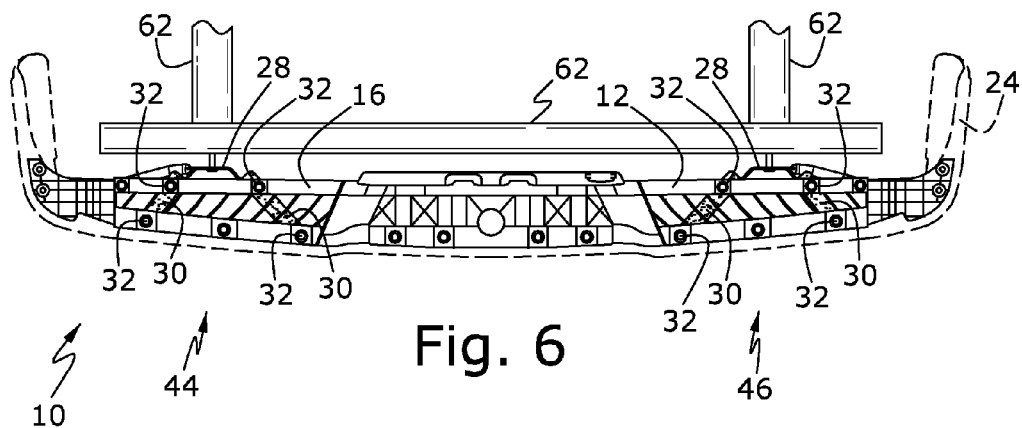
FIG. 6 is a top view of a first embodiment of the vehicle bumper assembly with the step pad removed.
Figure 7:
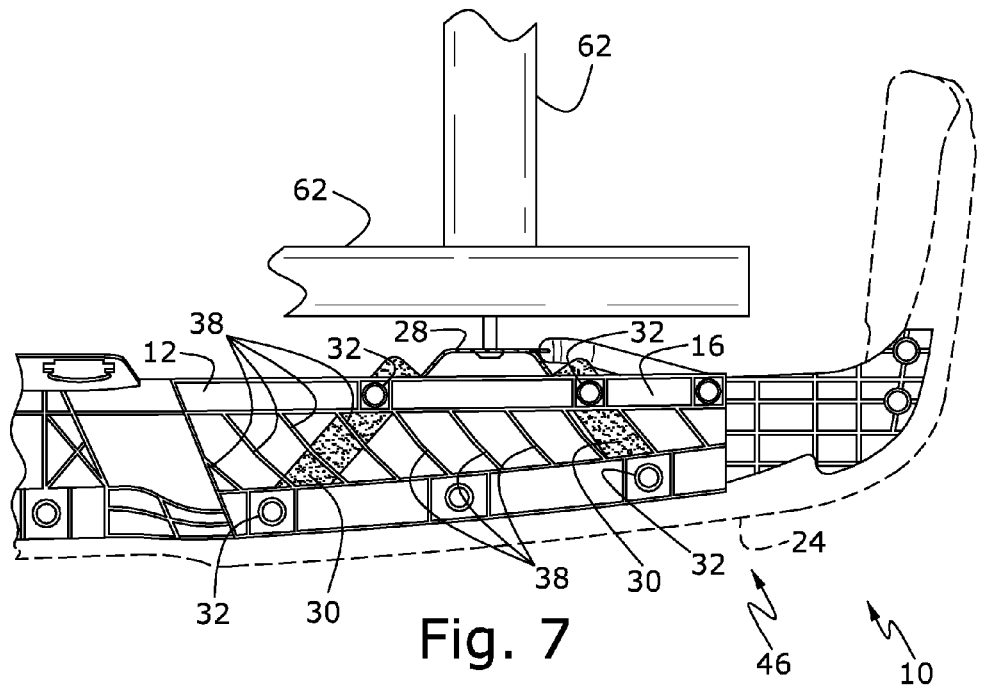
FIG. 7 is a top view of the right side of a first embodiment of the vehicle bumper assembly with the step pad removed.
Figure 8:
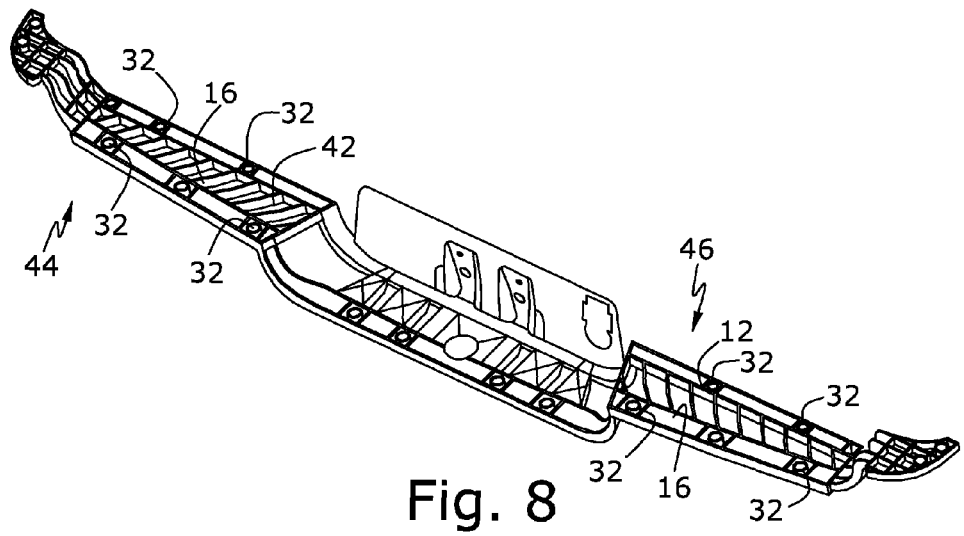
FIG. 8 is an isometric view of the energy absorber of a first embodiment of the vehicle bumper assembly.
Figure 9:
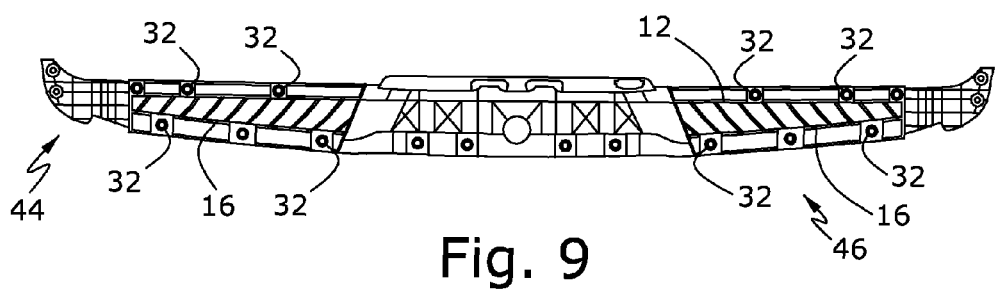
FIG. 9 is a top view of the energy absorber of a first embodiment of the vehicle bumper assembly.
Figure 10:
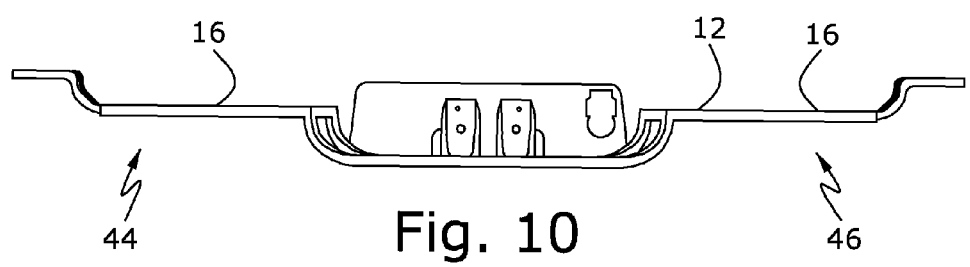
FIG. 10 is a rear view of the energy absorber of a first embodiment of the vehicle bumper assembly.
Figure 11:
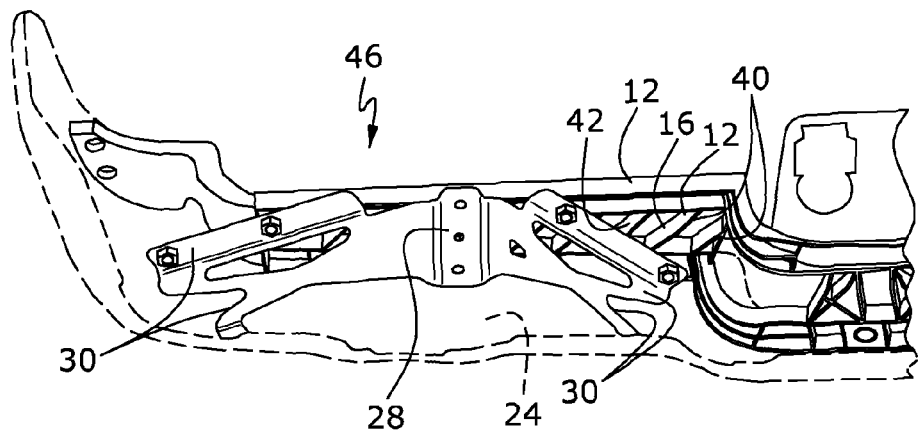
FIG. 11 is a front view of the bumper fascia, bracket and energy absorber of the first embodiment of the vehicle bumper assembly.
Figure 12:
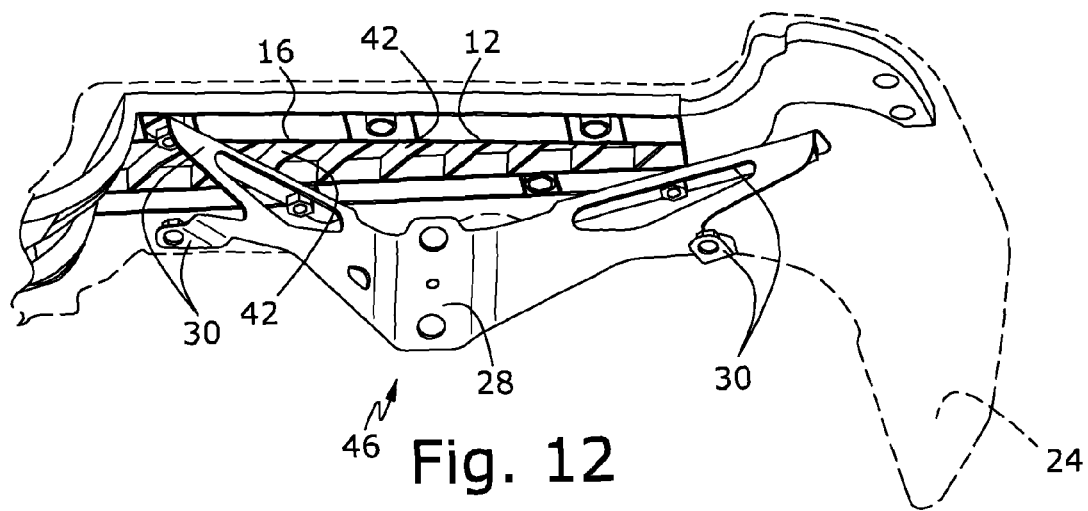
FIG. 12 is a rear view of the bumper fascia, bracket and energy absorber of the first embodiment of the vehicle bumper assembly.

With reference to FIGS. 3-7, the bracket 22 of the present disclosure is shown. It is understood that a bracket 22 is implemented on each of the left side 44 of the vehicle 26 and the right side 46 of the vehicle 26 as shown in the FIGS. 1-11. As shown in FIGS. 3 and 4, the second end of the bracket 22 includes two mounting arms 30 which are affixed to the energy absorber 12 at two corresponding different transverse locations along the energy absorber 12. Each bracket 22 may be, but not necessarily be affixed to the energy absorber 12 using mechanical fasteners as shown in FIG. 4.

Again, with reference to FIGS. 1-11, each fin 18 in the plurality of fins 18 may be configured to have an upper horizontal edge 38 (shown as 38 in FIGS. 4, 7, 11), a lower horizontal edge 40 (shown in FIGS. 4, 7 and 11), and two vertical faces 42. As shown, the two vertical faces 42 may be substantially longer than the upper and lower horizontal edges 38, 40. This configuration allows for the energy absorber 12 to flex and absorb energy appropriately when a load 15 (particularly a corner load) is applied the vehicle bumper assembly 10. It is further understood that the step pad 14 and the bumper fascia 24 may also be formed from a flexible polymeric material which are each also capable of flexing when a load is applied.

As shown in FIGS. 1, 3, 6, and 8-10, the energy absorber 12 of the first embodiment may include a left side 44 and a right side 46. As shown, the left side 44 and the right side 46 each include a corresponding upper horizontal surface 16 for each of the left and right side 44, 46. Moreover, the plurality of fins 18 which are defined in the corresponding upper horizontal surface 16 of the left side 44 may be configured in a diagonally opposite direction as those plurality of fins 18 which are defined in the upper horizontal surface 16 of the right side 46.

Figure 13:
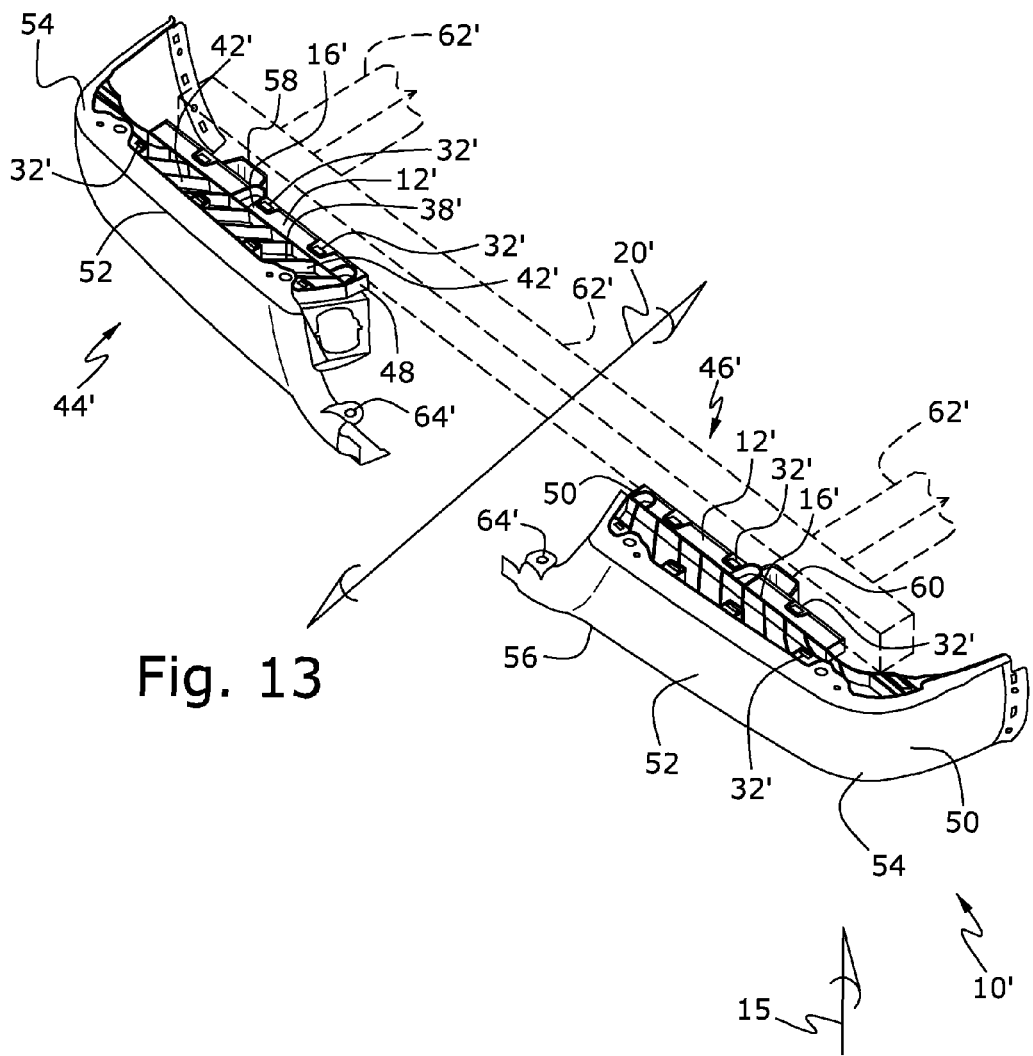
FIG. 13 is an isometric view of the energy absorber of a second embodiment of the vehicle bumper assembly.
Figure 14:
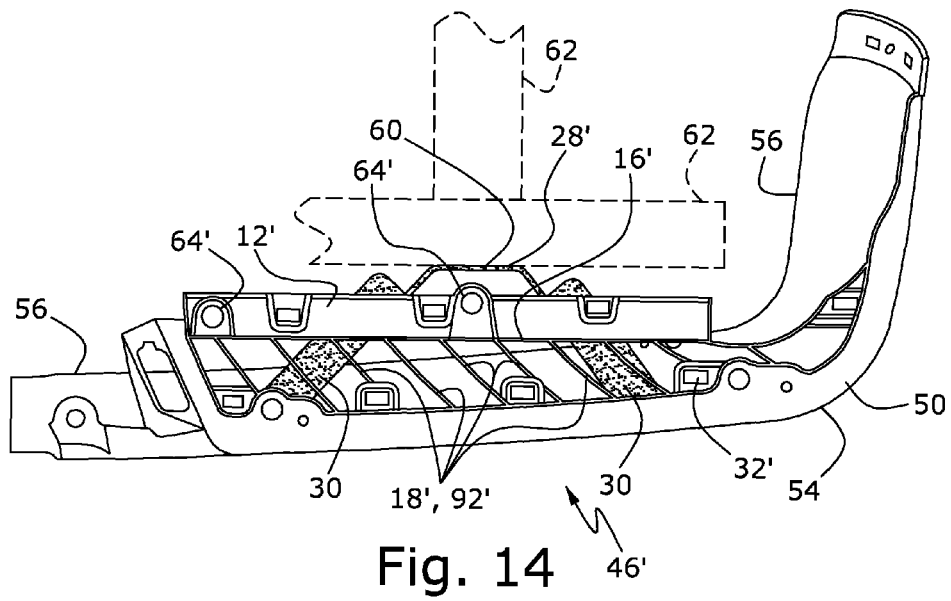
FIG. 14 is a top view of the right side of the energy absorber of a second embodiment of the vehicle bumper assembly.
Figure 15:
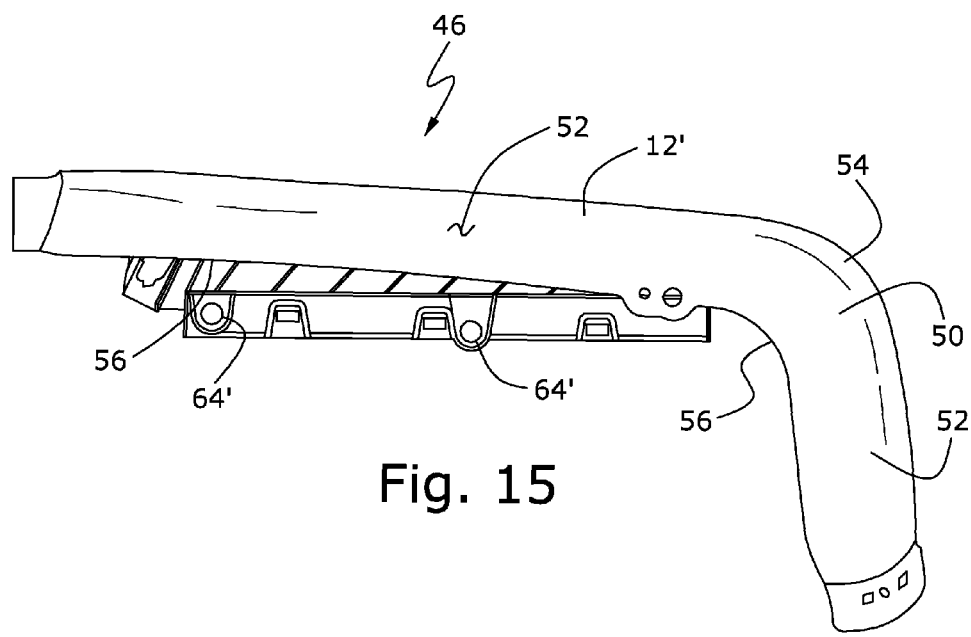
FIG. 15 is a bottom view of the right side of the energy absorber of a second embodiment of the vehicle bumper assembly.
Figure 16:
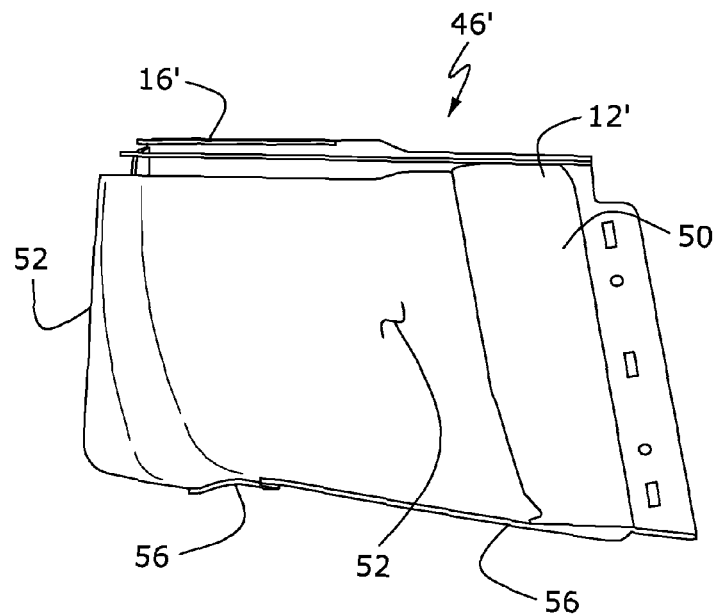
FIG. 16 is a side view of the right side of the energy absorber of a second embodiment of the vehicle bumper assembly.

Referring now to FIGS. 13-17, a second embodiment of the present disclosure is provided wherein a vehicle bumper assembly 10' includes an energy absorber 12' formed by two separate components—a left pod 48 and a right pod 50. As shown in FIG. 13, each of the left pod 48 and the right pod 50 include an upper horizontal surface 16'. The upper horizontal surface 16' in each of the left pod 48 and the right pod 50 define a deformable structure 92'. Again, as shown as a non-limiting example, the deformable structure 92' is a plurality of fins 18' which are disposed in a substantially diagonal direction relative to the longitudinal axis 20' of a vehicle. As shown in FIG. 13 and similar to the first embodiment, the plurality of fins 18' which are defined in the upper horizontal surface 16' of the left pod 48 are configured in a diagonally opposite direction as those plurality of fins 18' which are defined in the upper horizontal surface 16' of the right pod 50. Furthermore, as shown in FIGS. 13-15, each of the left and right pods 48, 50 define a vertical wall 52 which curves around each bumper corner 54' and spans downward to the bottom pod edge 56. The bottom pod edge 56 is in close proximity to the bottom fascia edge 57 (shown in FIG. 17) when the components are assembled together.

Similar to the first embodiment and as shown in FIG. 13, the second embodiment includes a left bracket 58 mounted to a vehicle frame and a right bracket 60 mounted to the vehicle frame 62'. As shown, the left bracket 58 may couple the left pod 48 to the vehicle frame 62' (or steel bumper beam). The right bracket 60 may also be similarly mounted to the vehicle frame 62' (shown in FIG. 14) such that the right bracket 60 couples the right pod 50 to the vehicle frame 62'.

Figure 17:
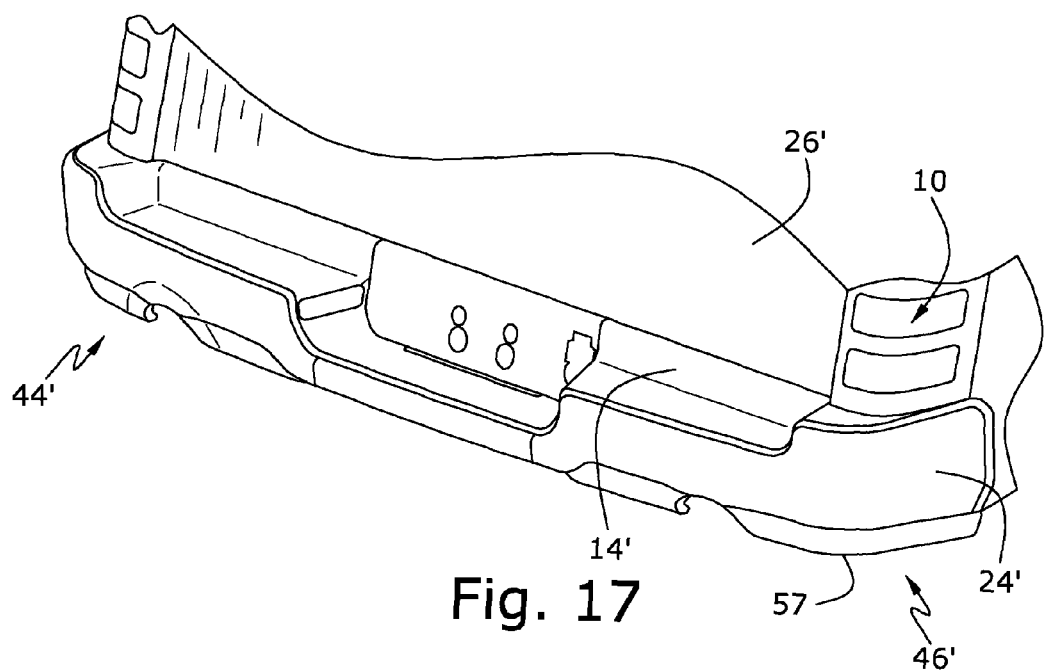
FIG. 17 is an isometric view of a second embodiment of the vehicle bumper assembly.

Furthermore, as shown in FIG. 17, a step pad 14' may be affixed to the left pod 48 and the right pod 50. Moreover, as shown in FIG. 17, a bumper fascia 24' may be affixed any one of or more the step pad 14', the left pod 48 (shown in FIG. 13) and the right pod 50 (shown in FIG. 13).

Referring back to FIG. 14, fastening points 64' may be formed in the upper horizontal surface 16' of the right pod 50 so that the step pad 14' (shown in FIG. 17) may be affixed to the right pod 50. It is understood that the left pod 48 has similar fastening points formed in the upper horizontal surface 16'. As shown in FIG. 17, the left pod 48 and right pod 50 may coupled to each other by either or both of the step pad 14' and/or the bumper fascia 24'.

Similar to the first embodiment, it is understood that the plurality of fins 18' defined in each of the left pod 48 and the right pod 50 are similarly configured with respect to each dimension of each fin 18. That is, each fin 18 in the plurality of fins 18' is configured to have an upper horizontal edge 38', a lower horizontal edge 40', and two vertical faces 42 such that the two vertical faces 42 are configured to be substantially longer than the upper and lower horizontal edges 38' and 40'. Again, this configuration allows the left pod 48 and the right pod 50 to flex by allowing the fins 18' to flex when the vehicle bumper assembly 10 and the energy absorber 12' are subjected to a load. In particular, the energy absorber 12' may efficiently absorb loads which are applied to each corner of the left pod 48 and the right pod 50.

Figure 18:
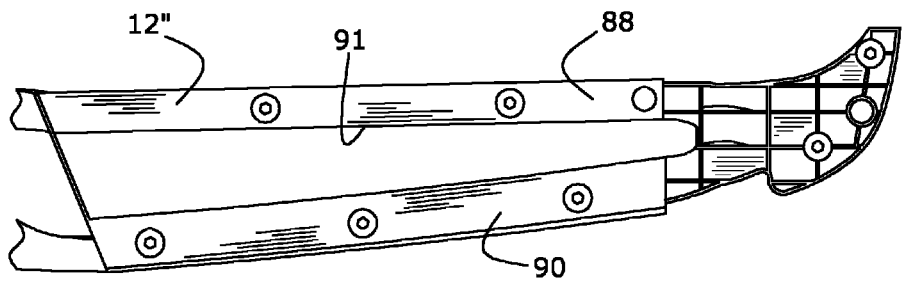
FIG. 18 is a plan or top view of a third embodiment of the present disclosure where the energy absorber is shown.
Figure 19:
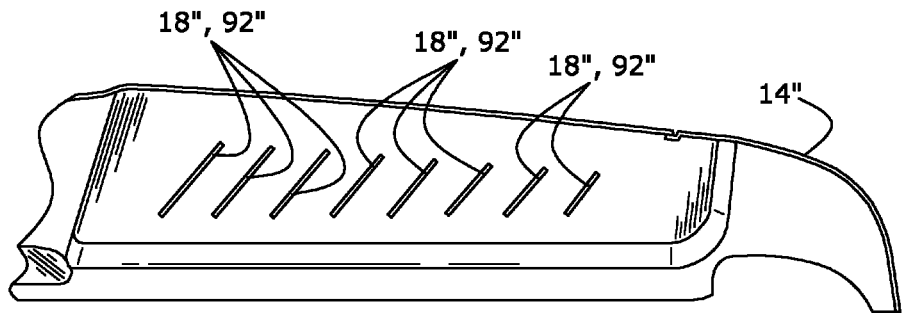
FIG. 19 is a bottom schematic view of a third embodiment of the present disclosure where the underside of the step pad defines the deformation structure in the form of fins.
Figure 20:
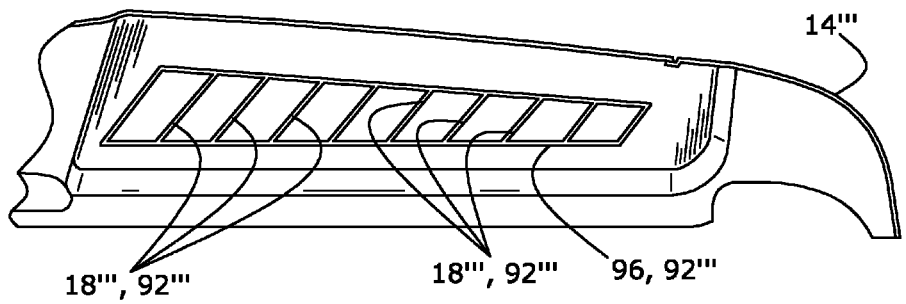
FIG. 20 is a bottom schematic view of a third embodiment of the present disclosure where the step pad defines a deformable structure in the form connecting fins via a perimeter wall.

Referring now to FIGS. 18-20, a third embodiment of the present disclosure is illustrated wherein the energy absorber 12" of the vehicle bumper assembly 10" no longer defines an interior deformable structure 92" in the form of fins or the like. Rather, the upper horizontal surface 16" of the energy absorber 12" is formed by lateral portions 88, 90 with opening 91 therebetween. As shown in FIGS. 19 and 20, the deformable structure 92" (in the form of flexible fins 18" and perimeter wall 96 shown schematically in FIGS. 19 and 20) may be integral to the step pad 14" or may be affixed to the step pad 14". It is understood that flexible fins 18" have length and width dimensions which are similar to that described in previous embodiments.

With reference to FIG. 19, the flexible fins 18″ or deformable structure 92″ are operatively configured to be disposed between the lateral portions 88, 90 when the step pad 14″ is assembled to the energy absorber 12″. Accordingly, the deformable structure 92″ and the energy absorber 12″ may absorb energy when a load is applied to the vehicle bumper assembly 10″.

With reference to FIG. 20, the deformable structure 92‴ includes a perimeter wall 96. The flexible fins 18‴ are schematically shown wherein the flexible fins 18‴ are connected to one another via perimeter wall 96. The perimeter wall 96, flexible fins 18‴ and the step pad 14‴ may be formed as a single component using an injection molding process. Again, It is understood that flexible fins 18‴ have length and width dimensions which are similar to that described in previous embodiments. The perimeter wall 96 and the flexible fins 18‴ collectively form the deformable structure 92‴ in this fourth embodiment. Similar to the third embodiment, the deformable structure 92‴ of FIG. 20 is operatively configured to be disposed between the lateral portions 88, 90 of energy absorber 12″ (shown in FIG. 18).

While exemplary embodiments are described above, it is not intended that these embodiments describe all possible forms of the invention. Rather the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle bumper assembly comprising:
    an energy absorber having an upper horizontal surface, the upper horizontal surface defining a plurality of fins which are disposed in a substantially diagonal direction relative to the longitudinal axis of a vehicle;
    a two armed bracket mounted to a vehicle frame on a first end of the two armed bracket and the energy absorber affixed to a second end of the two armed bracket;
    a step pad affixed to the energy absorber; and
    a bumper fascia affixed to the at least one of the step pad and the energy absorber.

2. The vehicle bumper assembly of claim 1 wherein the energy absorber spans the vehicle width.

3. The vehicle bumper assembly of claim 1 wherein the second end of the two armed bracket includes two mounting arms affixed to the energy absorber at two corresponding different transverse locations on the energy absorber.

4. The vehicle bumper assembly of claim 1 wherein the two armed bracket is configured to include a crush initiator for improved energy absorption.

5. The vehicle bumper assembly of claim 1 wherein each fin is configured to have an upper horizontal edge, a lower horizontal edge, and two vertical faces.

6. The vehicle bumper assembly of claim 2 wherein the energy absorber includes a left side and a right side, the left side and the right side each including the upper horizontal surface.

7. The vehicle bumper assembly of claim 6 wherein the fins of the left side and the fins of the right side are configured in diagonally opposite directions.

8. A vehicle bumper assembly comprising:
    an energy absorber having a left pod and a right pod, each of the left pod and the right pod having an upper horizontal surface, the upper horizontal surface defining a plurality of fins which are disposed in a substantially diagonal direction relative to the longitudinal axis of a vehicle;
    a first two armed bracket mounted to a vehicle frame, the first two armed bracket coupling the left pod to the vehicle frame;
    a second two armed bracket mounted to a vehicle frame, the second two armed bracket coupling the right pod to the vehicle frame;
    a step pad affixed to the left pod and the right pod; and
    a bumper fascia affixed to the at least one of the step pad, the left pod and the right pod.

9. The vehicle bumper assembly of claim 8 wherein the left pod and right pod are coupled to each other via at least one of the step pad or the bumper fascia.

10. The vehicle bumper assembly of claim 8 wherein the fins of the left pod and the fins of the right pod are configured to be disposed in diagonally opposite directions.

11. A vehicle bumper assembly comprising:
    an energy absorber having an upper horizontal surface, the upper horizontal surface defining a deformable structure;
    a two armed bracket mounted to a vehicle frame on a first end of the two armed bracket and the energy absorber affixed to a second end of the two armed bracket;
    a step pad affixed to the energy absorber; and
    a bumper fascia affixed to the step pad and the energy absorber.

12. A vehicle bumper assembly comprising:
    an energy absorber having an upper horizontal surface, the upper horizontal surface defining at least two lateral portions;
    a two armed bracket mounted to a vehicle frame on a first end of the two armed bracket and the energy absorber affixed to a second end of the two armed bracket;
    a step pad affixed to the energy absorber, the step pad further defining a deformable structure integral to the step pad, the deformable structure being operatively configured to be disposed between the at least two lateral portions of the energy absorber when the step pad is mounted to the energy absorber; and
    a bumper fascia affixed to the at least one of the step pad and the energy absorber.

13. The vehicle bumper assembly of claim 12 wherein the deformable structure is formed from a plurality of fins integrally attached to the step pad.

14. The vehicle bumper assembly of claim 12 wherein the deformable structure is formed from a perimeter wall and a plurality of fins which are connected to one another via the perimeter wall.

15. The vehicle bumper assembly of claim 1 wherein a bottom surface of the step pad is directly coupled to and supported by a top surface of the energy absorber.

16. The vehicle bumper assembly of claim 3 wherein each mounting arm includes a crush initiator.

17. The vehicle bumper assembly of claim 16 wherein each crush initiator comprises at least one aperture.

18. The vehicle bumper assembly of claim 11 wherein a bottom of the step pad is directly coupled to and supported by a top of the energy absorber.

19. The vehicle bumper assembly of claim 11 wherein the energy absorber comprises:
    a first plurality of fins located in a left side of the energy absorber, the first plurality of fins arranged parallel and offset from one another forming a first series of trapezoidal structures in the left side of the energy absorber; and a second plurality of fins located in a right side of the energy absorber, the second plurality of fins arranged parallel and offset from one another forming a second series of trapezoidal structures in the right side of the energy absorber.

20. The vehicle bumper assembly of claim 19 wherein each fin of the first plurality of fins is arranged at an oblique angle relative to each fin of the second plurality of fins.

* * * * *